Jan. 14, 1969   C. H. LOCKE ETAL   3,421,638
PROCESSING SYSTEM FOR HANDLING ARTICLES SUPPORTED ON HOLDERS
Filed Nov. 14, 1966

INVENTORS
CHARLES H. LOCKE
GEORGE R. SANTILLO, JR.

BY Wolmar J. Stoffel
ATTORNEY

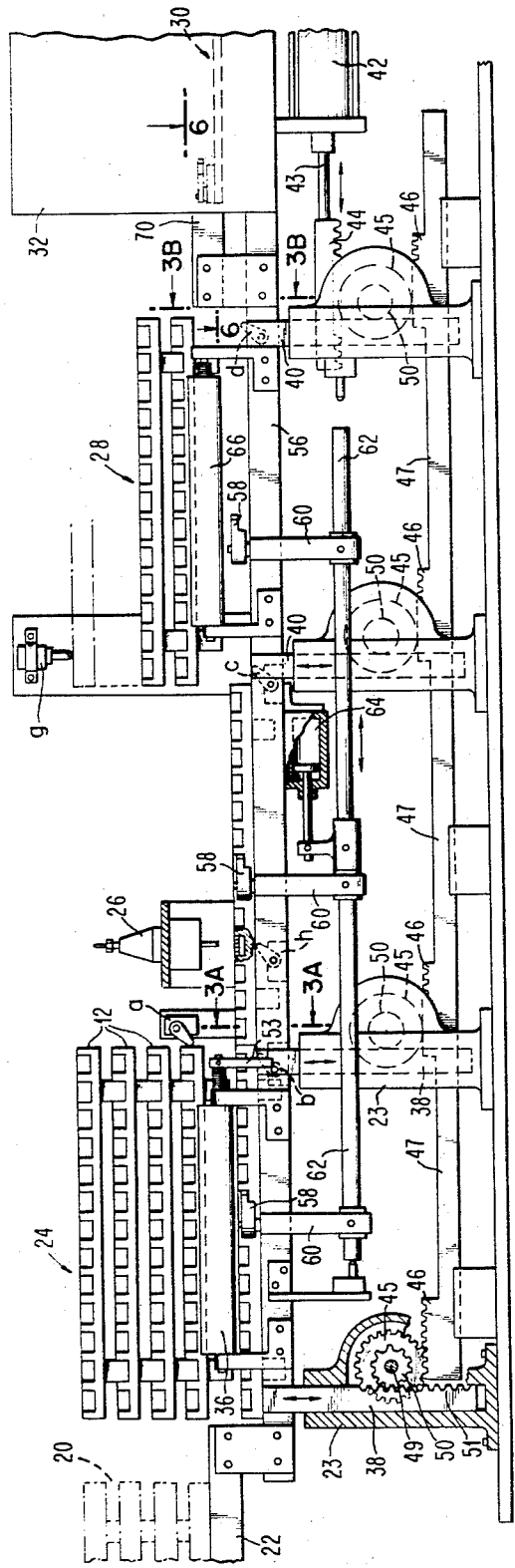

United States Patent Office

3,421,638
Patented Jan. 14, 1969

1

3,421,638
PROCESSING SYSTEM FOR HANDLING ARTICLES
SUPPORTED ON HOLDERS
Charles H. Locke and George R. Santillo, Jr., Wappingers
Falls, N.Y., assignors to International Business Machines Corporation, Armonk, N.Y., a corporation of New York
Filed Nov. 14, 1966, Ser. No. 593,764
U.S. Cl. 214—6                                9 Claims
Int. Cl. B65g *57/30;* B65g *1/00;* F26b *13/10*

ABSTRACT OF THE DISCLOSURE

The apparatus has a workpiece holder stacking mechanism, a conditioning environment, and a conveyor to move stacks of holders into and out of the conditioning environment enclosure. The stacking mechanism is provided with a sensor which is adjustable to control the number of holders in the stacks that are subsequently moved into the enclosure. Adjustment of the sensor to increase the size of the stacks serves to increase the workpiece exposure time in the enclosure, and conversely, decreasing the size of the stacks serves to decrease the workpiece exposure time.

---

This invention relates to a manufacturing system for processing articles supported on holders, more particularly to an article handling system including a holder stacking mechanism, a conditioning environment, and a conveyor for moving the resultant stacks of holders through the conditioning environment. The invention is an automated manufacturing system which receives articles supported on holders from a source at a relatively constant rate and moves the articles through a conditioning environment where they are exposed to a controlled environment for predetermined length of time.

Modern automated manufacturing lines frequently embody facilities for curing, drying, heating, cooling, etc. in which the articles being processed are continuously moved through a conditionng einvironment. In a line having a high volume rate of production, such facilities are expensive, cumbersome, and occupy a great deal of floor space. The enclosures for the conditioning environment associated with manufacturing lines with high rates of production must necessarily be capable of handling large accumulations of the workpieces or articles being produced in order to obtain the required lengths of environmental exposure of the articles. Two obvious methods of obtaining the required environmental exposure are (1) providing an enclosure with a continuous conveyor therein that is sufficiently long to enclose the articles the required length of time, or (2) provide a conveyor within the enclosure that traverses the enclosure or otherwise follows a torturous path to provide the required exposure time. Both of the aforementioned methods require apparatus that is expensive and which occupies a great deal of space. Further, when manufacturing lines have a downstream process apparatus that receives articles from an upstream apparatus that operates at a rate which varies from the rate of the upstream apparatus an interface problem exists since the accumulation between the respective apparatus will vary.

In curing and drying apparatus, vapors are frequently evolved which are potentially explosive when combined with air in certain concentration ranges. Electrical control systems for such apparatus have a potential capability for providing a spark which can set off an explosion mixture exists.

An object of this invention is to provide a new manu-

2 facturing system for exposing articles to a controlled environment.

Another object of this invention is to provide a new processing system adapted to provide adjustment between input rate and environmental exposure time.

Yet another object of this invention is to provide a new processing apparatus for continuous manufacturing production lines adapted to maintain constant article environmental exposure time for different article input rates.

Still another object of this invention is to provide a new processing apparatus for manufacturing systems adapted to vary the environmental exposure time for a constant input rate.

Another object of this invention is to provide a continuous processing apparatus for exposing articles to a controlled environment that requires a minimum of capital investment.

Another object of this invention is to provide a new processing apparatus for manufacturing systems for exposing articles to a controlled environment in a continuous process that requires a minimum of floor space.

Yet another object of this invention is to provide a new processing apparatus for manufacturing systems for exposing articles to a controlled environment that is capable of acting as an interface to eliminate accumulation or depletion of articles being processing between associated processing apparatus operating at intermittent or slightly different rates.

Another object of this invention is to provide a new processing apparatus for manufacturing systems provided with an automatic control system that is dependable in operation and does not have an ignition capability in areas where there is potentially combustible gas mixtures.

The processing system of the invention for continuously exposing workpieces supported on holders to a conditioning environment has a holder-stacking means in combination with a means for advancing holders to the stacking means at a relatively uniform input rate. A conditioning environment enclosure is provided with a conveyor means for moving the resultant stack of holders supporting unconditioned workpieces from the stacking means into the enclosure and moving a stack of holders supporting conditioned workpieces from the enclosure. An automatic control means is provided for actuating and correlating the operations of the means for advancing the holders, the holder stacking means, and the conveyor means. Preferably the processing system of the invention is provided with a stack height sensor and a means for adjusting the vertical position of the sensor to thereby adjust the stacking means to accumulate a predetermined number of holders in the resultant formed stacks.

The processing system for exposing articles to a conditioning environment of our invention is adapted to correlate workpiece or article input rate and environmental exposure time. The environmental exposure time can be varied while the input rate is maintained constant, or conversely, the environmental exposure time can be maintained at a constant value for various article input rates. This correlation can be accomplished by varying the height of the stacks of holders that are advanced into the conditioning environment enclosure. The processing system of our invention requires a minimum of floor space and capital investment. Further, when provided with a pneumatic control, the danger of igniting potentially explosive gaseous mixtures resulting from the curing, heating, etc. in the conditioning environment is greatly reduced.

The foregoing and other objects, features and advantages of the invention will be apparent from the more particular description of a preferred embodiment of the invention, illustrated in the accompanying drawings, wherein:

FIGURE 2 is a side elevation view of a preferred specific embodiment of a workpiece holder handling apparatus subcombination of the processing system of the invention;

FIGURE 3a is a detailed view in enlarged scale taken on line 3a—3a in FIGURE 2 illustrating the specific structure and mode of operation of the workpiece holder support and elevating means;

FIGURE 3b is a detailed view in enlarged scale taken on line 3b—3b of FIGURE 2 illustrating the specific structure and mode of operation of the workpiece holder support in the restacking mechanism;

FIGURE 4 is a perspective view in broken section of the preferred embodiment of the workpiece holder or tray;

FIGURE 6 is a detailed view in enlarged scale in partially broken section taken on line 6—6 of FIGURE 2 illustrating the structure of a preferred specific embodiment of the stack conveyor means.

Figure 1:
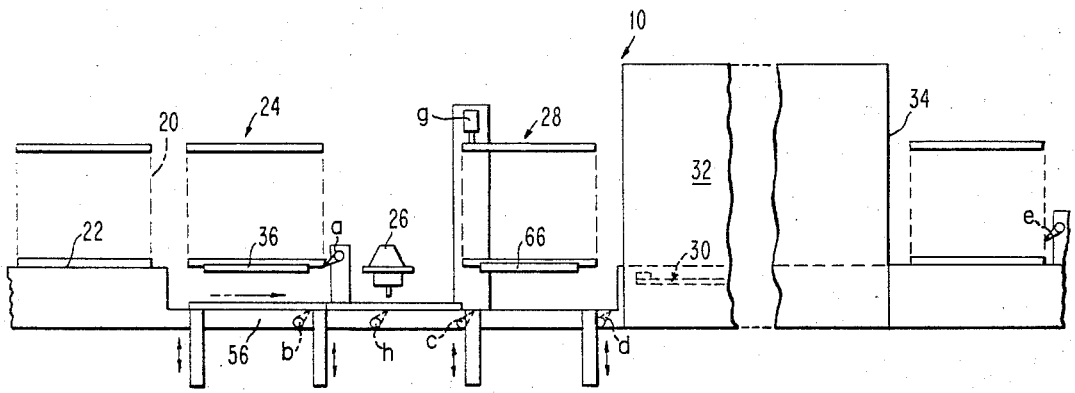
FIGURE 1 is a schematic elevational view of a specific embodiment of the processing system of the invention.

Referring now to FIG. 1 of the drawing, there is shown a manufacturing line wherein pieces being processed are supported on trays 12 of the type shown in detail in FIG. 4. The tray 12 has pockets 14 arranged in rows and columns. The tray is also provided with downwardly extending spacing lugs 16 adapted to be received in the depression on the top side of the tray formed by ridges 17 and 18. As will be apparent, the trays 12 can be stacked to any reasonable height. The preferred specific embodiment of the manufacturing line illustrated and described in the specification is adapted to package electronic modules consisting of a substrate mounted in a metal cap. The modules are deposited in the trays 12 in an inverted position with the open end of the cap facing upwardly with a substrate deposited therein. The manufacturing line is adapted to initially dispense a primer fluid over the substrate, and subsequently dispense a curable sealing material to seal the joint between the substrate and the cap. It is understood, however, that any suitable processing operation wherein an article is exposed to a conditioning environment is within the purview of the invention.

The workpieces to be processed are normally received by the processing system in stacks 20 of trays 12 of any suitable height from input conveyor 22. A suitable transfer mechanism is normally provided to advance stack 20 to the unstacking station 24. At the unstacking station 24, an unstacking mechanism removes the bottom tray from the stack, deposits it on rails 56, and indexes it beneath a fluid dispenser 26. Fluid dispenser 26 and the pneumatic control therefore are described and claimed in commonly assigned co-pending application Ser. No. 585,542 filed Oct. 10, 1966. After the articles have been indexed beneath the fluid dispenser 26, they are moved to the restack station 28 where the tray is elevated and added to the bottom of the stack. When the stack is accumulated to the desired height, it is moved by conveyor 30 into enclosure 32 containing a conditioning environment. In practice, the conditioning environmet can be used to heat, cure, dry, cool, etc. the workpieces being processed. The stacks are moved through the enclosure 32 by the conveyor 30. Each time a new stack is moved into enclosure 32 a stack of conditioned workpieces is moved out the exit end 34. The processing system 10 of the invention is particularly adapted for manufacturing operations wherein a subsequent process takes place on the workpieces immediately after they leave enclosure 32. In such applications, an unstacking station, a fluid dispense station, and a restack station (not shown) generally similar to 24, 26, and 28, repectively, are located on the end of the manufacturing line shown in FIG. 1.

Referring now to FIG. 2 there is shown a preferred specific embodiment of unstacking and restacking mechanisms 24 and 28, respectively. A stack of trays is supplied by conveyor 22 from which the stack is moved to the untacking station 24. The stack is supported at unstack station 24 by pivotally mounted stack support rails 36 that engage the opposite sides and bottom of the tray of the stack. Vertically slideable elevator rods 38 are located at generally the four corners of the stack. The elevator rods 38, as well as elevator rods 40 of the restack station 28 are actuated by a single power operated cylinder 42 through sets of racks and pinions. As indicated in FIG. 2, gear rack 44 located on piston rod 43 of cylinder 42 engages a pinion 45. Pinion 45 inturn engages a gear rack 46 on actuation rod 47. Rod 47 is provided with gear racks 46 at spaced locations along this length. Gear racks 46 are engaged by pinions 45 mounted on rotatably mounted shafts 49 supported on frame 23. On the ends of shafts 49 are provided pinions 50 which are in engagement with racks 51 on elevator rods 38. As indicated in FIG. 3, the stack support rail 36 is pivoted into and out of stack supporting position by a cam 52 on elevator cooperating with cam follower 53. In operation, the bottom tray in the stack is lowered at station 24 from the support rails 36 to a lower level onto support rails 56 for indexing under fluid dispenser 26. This operation is accomplished when cylinder 42 is actuated which initially moves the elevator rods 38 upwardly under the stack to raise the stack off pivotally mounted support rails 36. Simultaneously the rails 36 are pivoted out of support position. The stack is then lowered by the elevators 38. After the lower tray is moved to a position beneath the support rails 36 they are moved into support position to support the next successive tray.

After a tray has been deposited on rails 56 by the unstacking mechanism, the tray is indexed under the fluid dispenser 26. The indexing is accomplished by pawls 58 mounted on extensions 60 in turn mounted on a longitudinally movable rod 62. Rod 62 is actuated by cylinder 64. The pawls 58 engage the edge recesses of the trays. Each indexing movement placed a set of workpices beneath the fluid dispenser. The fluid dispenser 26 is provided with a plurality of dispensing apertures adapted to dispense a measured amount of fluid onto each of the workpieces supported in the tray.

At restack station 28 there is provided a pair of pivotally mounted support rails 66 which are spring-biased into supporting position. The rails 66 engage the side and bottom edges of the bottom tray of the stack at station 28. Vertically movable elevators 40, described previously, are adapted to lift a tray from support rail 56 and place is on support rails 66. The pivotally mounted rails 66 are cammed outwardly by the tray to allow passage therebetween. The restack mechanism builds a stack of trays from the bottom. The stacking operation continues until the stack height sensor g is actuated to cause the stack to be conveyed into enclosure 32. The height of the stack of trays can be varied by moving the sensor g up or down.

The completed stacks of trays from the restacking mechanism are moved from rails 66 into enclosure 32 containing a suitable conditioning environment. The stacks are moved by a conveyor 30 consisting of a reciprocating bar assembly 72 having mounted thereon spring-biased retractable pawls 74. The pawls 74 engage the tray, preferably the spacing studs 16 as shown most clearly in FIG. 6. The bar assembly 72 is reciprocated by any suitable power unit, preferably a hydraulic or pneumatic cylinder.

The enclosure 32 is capable of receiving and holding a predetermined number of stacks. Each time a new stack is introduced into the enclosure a stack containing conditioned workpieces is moved out of the exit 34. The fluid dispensing unit 26 will supply trays at a relatively uniform rate. However, the rate at which the stacks are completed and moved into the enclosure 32 is dependent on the height of the resultant stacks. Thus, the height of the stacks can be used to control the exposure time of articles being conditioned in the enclosure since the time that any given stack remains in the enclosure is dependent on the rate at which stacks are formed. For example, doubling the height of the stacks increases the stack forming time by a factor of two, and therefore the rate of introduction into the chamber by one half. Thus, if the introduction rate is one half as great, the exposure time is doubled. The height of the stack can be controlled by simply adjusting the vertical height of the stack sensor g. The restacking apparatus 28 can be used to handle any suitable type workpiece holder from any suitable process. In general, the workpiece holders are moved to the restack apparatus at a relatively constant average rate. When the workpiece input rate to the restack station varies or is intermittent, a control to automatically vary the sensor height to compensate for the rate inconsistency to maintain a uniform exposure can be provided.

The processing system of the invention can be advantageously utilized as an interface in a manufacturing line. Referring to FIG. 1, a second processing operation which operates at a slightly different rate than the initial fluid dispenser 26, or other process apparatus can be set up to operate on the workpieces after they leave enclosure 32. A preferred application is providing a second fluid dispensing operation for applying a curable sealant material, with the first fluid dispensing application applying a primer for the sealant. The preferred manufacturing line would embody a combination of two sets of apparatus of the type shown in FIG. 1 arranged to operate consecutively on the articles to be processed. More specifically, the stacks of trays as they leave enclosure 32 would be received into an unstacking station similar to station 24. Sensor e would be comparable to stack presence sensor a. Sensor E would be associated with the control mechanism to control the initial unstacking and restacking as will be explained in detail hereinafter.

The sensors for detecting the various operating conditions during operation of the system are shown in FIGS. 1 and 2. Sensor a detects the presence or absence of trays on support rails 36 at the unstacking station 24. Sensor b detects whether or not a tray is located on rails 56 and is at least partially under station 24. In effect it detects whether or not the unstacking mechanism should be activated to lower another tray on rails 56. Sensor c detects the presence of a tray in the restacking station. Sensor c transfers control of the operation to and from sensors b and d. Sensor d senses when the tray indexed from the fluid dispenser is in position to be added to the stack at the restacking station 28. Sensor e is the interlock control sensor that is used when the manufacturing line embodies two separate processing operations. Sensor e determines whether or not the stack of trays has been removed by the second unstacking apparatus. If any trays of the stack at the second restacking station remain, the conveyor cannot be actuated to remove the stack of trays from the restack station 28 for movement into the enclosure 32. Sensor g detects whether or not the stack of trays accumulating at the restack station 28 is complete, i.e. has reached the predetermined height.

Figure 5:
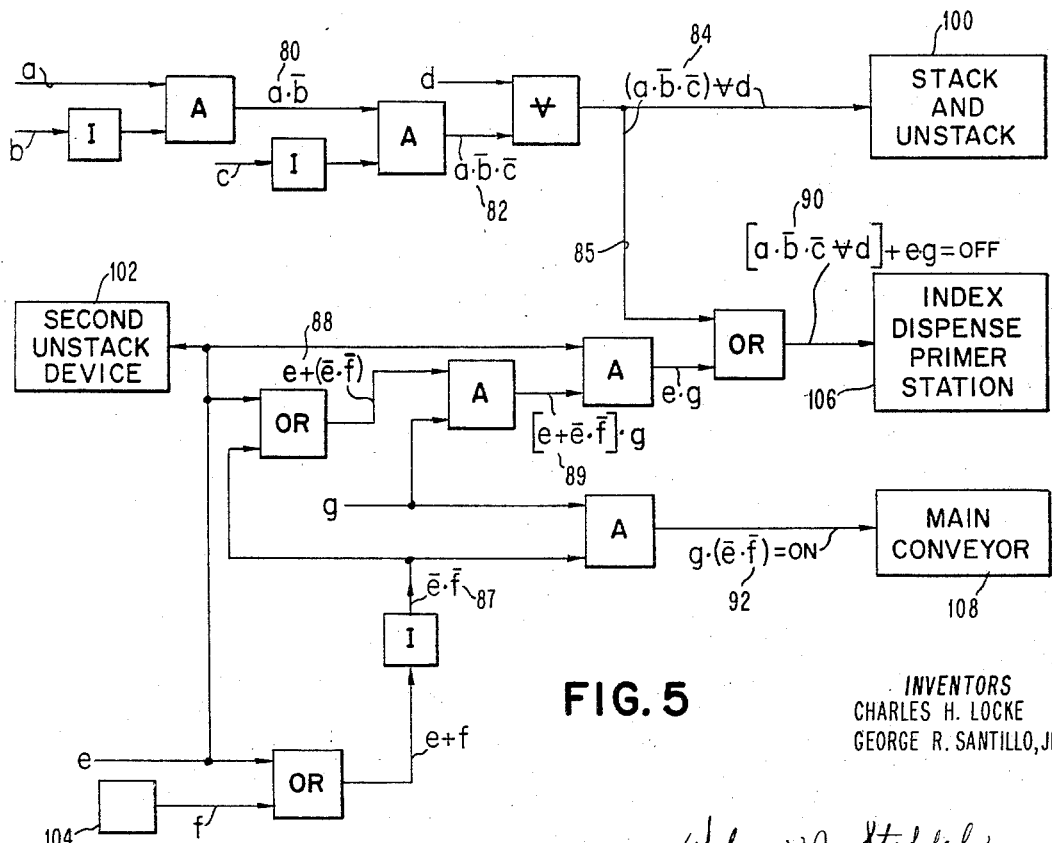
FIGURE 5 is a logic diagram illustrating the general structure and mode of operation of the control system of the processing apparatus of our invention.

The logic diagram of FIG. 5 depicts a preferred embodiment of the control for the processing system of the invention. The inputs have been labeled to correspond to the sensor devices which sense the various operating conditions. The diagram depicts a control system that provides an interlock between two successive process operations. At 80, the condition indicated that will result in an output from the preceding logic block is at least one tray supported on rails 36 at the unstack station without a tray lowered into position on rails 56. At 82, the conditions necessary to produce an output from the preceding logic block are (1) at least one tray at station 24 supported on rails 36, and (2) absence of trays on rails 56 to depress sensors b and c. At 84, either of two express conditions produce an output from the previous logic block, namely, the same conditions at 82, or a tray has been indexed directly under the restack station 28 to activate sensor d. When either of the aforementioned sets of conditions exist a command is sent to logic block 100, not illustrated in detail. This logic block is capable of distinguishing when either of the last mentioned conditions at 84 are fulfilled. When either of the aforementioned conditions exist, the logic system 100 activates cylinder 42 which initiates an unstacking operation at 24, and a restacking operation at 28. At 85, output 84 is introduced to logic block 106, not illustrated in detail, inhibiting the tray indexing and dispensing operations.

Logic block 106 represents a logic circuit, not illustrated in detail, which initiates indexing of the trays unless inhibited by input 90. This circuit 106 initiates a new indexing cycle after completion of the stacking and/or unstacking cycle, when called for by condition 84, or after completion of transfer of stacks of trays into enclosure 32 by circuit block 108, when called for by condition 92. Completion of either/or both of the aforementioned cycles of operation negates the inhibiting condition 90 allowing resumption of indexing operations.

Sensor e detects whether or not there are trays at a second unstack station in a manufacturing line embodying two sequential process operations. Input f is provided by a manual control 104 normally used to clear the system. Logic block 102 not illustrated in detail, initiates an unstacking operation at only the second unstacking mechanism upon demand of a processing operation that receives trays from the mechanism. At 87, the conditions necessary to satisfy the previous logic block are no trays at the second unloading mechanism and manual control 104 has not been actuated. At 88, either the conditions that exist at 87, or the presence of trays at the second unstacking station are required to satisfy the previous logic block to initiate an output. At 89, two alternate conditions satisfy the previous logic block, namely (1) there is a stack of trays at the second unstacking station and there is a full stack of trays at the restack station 28, or (2) there are no trays at the second unstacking station, the manual control has not been actuated, and there is a full stack of trays at the restacking station 28. At 90, the conditions necessary to satisfy the previous logic block are (1) the conditions discussed at 85 or (2) there is at least one tray in the second unstack station and a full stack at station 28. The output is fed into a logic block 106, mentioned previously but not discussed in detail. Block 106 also senses the conditions detected by the sensor h and indexes the trays under the fluid dispenser 26 by actuating the cylinder 64 and causes the dispensing of fluid when appropriate. At 92, the conditions necessary to satisfy the previous logic block and produce an output are a complete stack of trays at the restack station 28, no stack of trays at the second unstacking station, and the manual control has not been actuated. The output resulting from satisfying the conditions indicated at 92 is fed to a control 108 which causes the conveyor to move a complete stack of trays from station 28 into enclosure 32. A stack of trays containing conditioned articles is also inherently moved out of enclosure 32 into the second restack station.

The aforediscussed logic control system can be either electrical or pneumatic. A pneumatic type control is preferred, particularly when a potentially explosive gaseous mixture can result from the operation carried out in the enclosure 32, as for example, when various plastics are cured and vapors evolve, or when a volatile primer fluid is applied. The elements of the control depicted by the logic diagram in FIG. 5 can be assembled from commercially available electrical or pneumatic units by one skilled in the art.

While the invention has been particularly shown and described with reference to a preferred embodiment, it will be understood by those skilled in the art that the various changes in form and detail may be made therein without departing from the spirit and scope of the invention.

We claim:
1. A continuous processing system for receiving from a source at a relatively uniform rate workpieces supported on holders and exposing the workpieces on holders to a conditioning environment comprising,
   a holder stacking means,
   a sensor element associated with said stacking means for controlling the stack height,
   support means to adjust the position of said sensor element to thereby permit varying the number of holders in the resultant formed stacks,
   a conditioning environment enclosure,
   a conveyor means for moving stacks of holders supporting unconditioned workpieces from said stacking means into said enclosure, and moving stacks of holders supporting conditioned workpieces from said enclosure,
   said conveyor means being inoperative during the stacking operation and being operative in response to completion of the stack,
   adjustment of the sensor means to increase the size of the stack thereby serving to increase the time that the preceding stacks remain in the enclosure, and
   adjustment of the sensor means to decrease the size of the stack thereby serving to decrease the time that the preceding stacks remain in the enclosure.

2. The processing system of claim 1 wherein said stacking means is further comprised of,
   an elevator for lifting holders, and
   means for supporting holders in the elevated position as received from said elevator.

3. The processing system of claim 2 wherein said conveyor means is comprised of,
   at least one stack support rail extending through said enclosure,
   an elongated reciprocating member positioned generally parallel to said rail,
   means for reciprocating said members, and
   latch means on said member for selective abutting engagement with stacks of holders slidably supported on said rail.

4. The processing system of claim 3 which further includes,
   a workpiece holder unstacking means, and
   means for advancing holders to said stacking means from said unstacking means.

5. The processing system of claim 4 wherein said holder unstacking means is comprised of,
   retractable means for supporting a stack of holders,
   an elevator adapted to engage the bottom holder in a stack of holders and lower same clear of said means for supporting a stack of holders, and
   a cam means for moving said retractable means for supporting a stack of holders out of supporting position and subsequently returning same to supporting position upon passage of a holder therebetween.

6. The processing system of claim 3 which further includes a holder unstacking means positioned to receive stacks of holders from said conditioning environment enclosure.

7. The processing system of claim 6 wherein said holder unstacking means is comprised of,
   retractable means for supporting a stack of holders,
   an elevator adapted to engage the bottom holder of a stack of holders and lower same clear of said means for supporting a stack of holders, and
   a cam means for moving said retractable means for supporting holders out of supporting relation, and subsequently returning same to supporting relation upon passage of a holder therebetween.

8. The processing system of claim 7 which further includes,
   a stack presence sensor on said unstacking means adapted to detect the presence or absence of at least one holder on said retractable means for supporting a stack of holders, and
   an automatic control means responsive to said last mentioned sensor to prevent actuation of said conveyor means until the stack is cleared.

9. The processing system of claim 2 wherein said automatic control means is a pneumatically operated logic system.

References Cited

UNITED STATES PATENTS

| | | | |
|---|---|---|---|
| 1,711,100 | 4/1929 | Payzant | 34—56 X |
| 2,370,422 | 2/1945 | Reed | 34—196 X |
| 2,423,557 | 7/1947 | Gray | 214—16.4 X |
| 2,650,696 | 9/1953 | Gedris | 198—221 |
| 2,744,372 | 5/1956 | Cleveland et al. | 214—6 X |
| 2,937,482 | 5/1960 | Lazott et al. | 214—6 X |
| 2,940,327 | 6/1960 | Gartner | 214—6 X |
| 2,978,125 | 4/1961 | Freeman | 214—6 X |
| 3,289,821 | 12/1966 | Bosse et al. | 198—221 |
| 3,235,100 | 2/1966 | Raynor | 214—6 |
| 3,325,021 | 6/1967 | Burns et al. | 214—8.5 X |

GERALD M. FORLENZA, *Primary Examiner.*

R. J. SPARR, *Assistant Examiner.*

U.S. Cl. X.R.

214—16; 34—56